US005703629A

United States Patent [19]

Mermelstein et al.

[11] Patent Number: 5,703,629
[45] Date of Patent: Dec. 30, 1997

[54] COMPUTER SYSTEM INCLUDING PROTECTED GRAPHICS DISPLAY CONTROL SIGNAL SEQUENCING

[75] Inventors: Lois D. Mermelstein; Kendall C. Witte, both of Austin, Tex.

[73] Assignee: Dell USA, L.P., Round Rock, Tex.

[21] Appl. No.: 489,011

[22] Filed: Jun. 8, 1995

[51] Int. Cl.[6] .................................................... G06F 13/10
[52] U.S. Cl. ........................ 345/213; 345/211; 395/750; 395/559
[58] Field of Search ........................ 345/211, 212, 345/213; 395/750, 500, 375, 559; 348/730; 364/146

[56] References Cited

U.S. PATENT DOCUMENTS

| | | | |
|---|---|---|---|
| 5,167,024 | 11/1992 | Smith et al. | 395/375 |
| 5,325,287 | 6/1994 | Spahr et al. | 364/146 |
| 5,375,209 | 12/1994 | Maher et al. | 395/500 |
| 5,389,952 | 2/1995 | Kikinis | 345/212 |

OTHER PUBLICATIONS

Guthrie, "Power on Sequencing for LCD Displays: When, Why, and How", Sharp Corp., Apr. 1972.

*Primary Examiner*—Mark R. Powell
*Attorney, Agent, or Firm*—Skjerven, Morrill, MacPherson, Franklin & Friel, L.L.P.; Stephen A. Terrile; Mark P. Kahler

[57] ABSTRACT

A computer system is provided which assures that display control signals provided to a display are properly sequenced despite the presence of ill-behaved application software. The risk of damage to displays which require control signals to be in a predetermined sequence is thus significantly reduced. An enable signal from the system's graphics controller is intercepted by a microcontroller. The microcontroller generate its own properly sequenced and timed display control signals in response to the enable signal from the graphics controller. The microcontroller controls a switching apparatus which couples clock and data signals from the graphics controller to the display at an appropriate time in the control signal sequence.

16 Claims, 9 Drawing Sheets

PANEL ON SEQUENCE

LCDON
(PRIOR ART)

CLOCKS/DATA
SIGNALS
(PRIOR ART)

LCDENA
(PRIOR ART)

PANEL OFF SEQUENCE

LCDON
(PRIOR ART)

CLOCKS/DATA
SIGNALS
(PRIOR ART)

LCDENA
(PRIOR ART)

PANEL-ON SEQUENCE
(INITIATED BY GRAPHICS CONTROLLER)
FIG. 4A
LCDON
(AT GRAPHICS CONTROLLER)
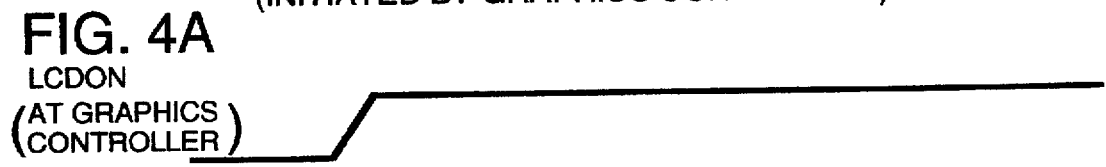
FIG. 4B
CLOCKS/DATA SIGNALS
(AT GRAPHICS CONTROLLER)
FIG. 4C
LCDENA
(AT GRAPHICS CONTROLLER)
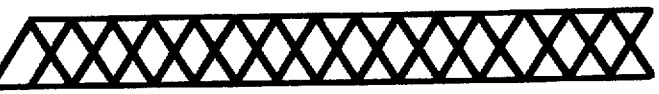
240
FIG. 4D
REAL_LCDON
(AT PANEL DISPLAY)
245
FIG. 4E
BUFFER OUTPUT ENABLE
(AT PANEL DISPLAY)
250
FIG. 4F
CLOCKS/DATA SIGNALS
(AT PANEL DISPLAY)
255
FIG. 4G
REAL_LCDENA
(AT PANEL DISPLAY)
260

PANEL-OFF SEQUENCE
(INITIATED BY GRAPHICS CONTROLLER)

LCDON
(AT GRAPHICS CONTROLLER)

CLOCKS/DATA SIGNALS
(AT GRAPHICS CONTROLLER)

LCDENA
(AT GRAPHICS CONTROLLER)

300

REAL_LCDON
(AT PANEL DISPLAY)

320

BUFFER OUTPUT ENABLE
(AT PANEL DISPLAY)

310

CLOCKS/DATA SIGNALS
(AT PANEL DISPLAY)

315

REAL_LCDENA
(AT PANEL DISPLAY)

305

PANEL-OFF SEQUENCE
(INITIATED BY MICRO-CONTROLLER)

LCDON
(AT GRAPHICS
CONTROLLER)

CLOCKS/DATA
SIGNALS
(AT GRAPHICS
CONTROLLER)

LCDENA
(AT GRAPHICS
CONTROLLER)

REAL_LCDON
(AT PANEL
DISPLAY)

BUFFER OUTPUT
ENABLE
(AT PANEL
DISPLAY)

CLOCKS/DATA
SIGNALS
(AT PANEL
DISPLAY)

REAL_LCDENA
(AT PANEL
DISPLAY)

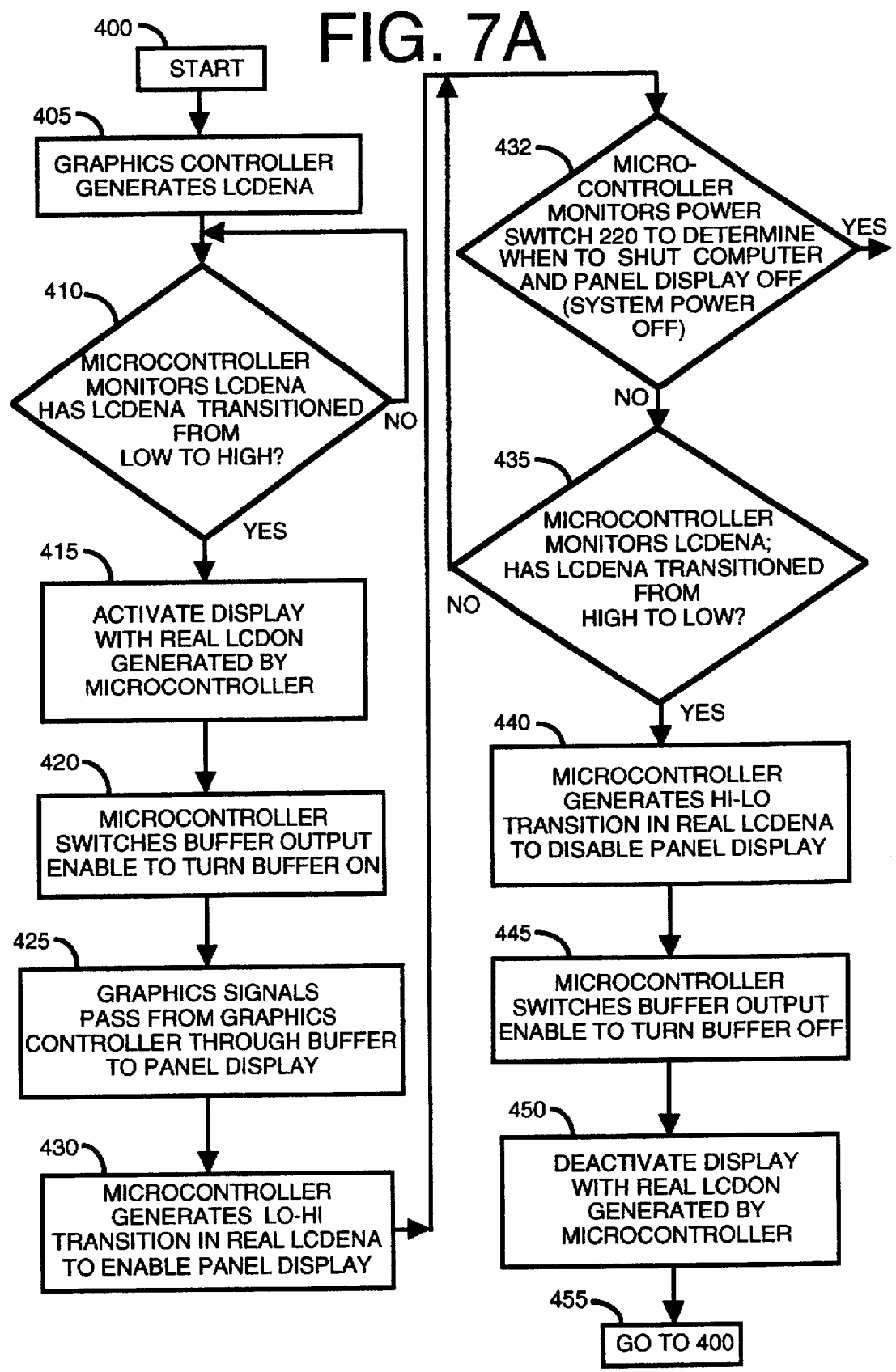

COMPUTER SYSTEM INCLUDING PROTECTED GRAPHICS DISPLAY CONTROL SIGNAL SEQUENCING

BACKGROUND OF THE INVENTION

1. Field of the Invention

This invention relates in general to computer systems and, more particularly, to display control apparatus for computer systems such as personal computer systems.

2. Description of Related Art

Personal computer systems in general and IBM compatible personal computer systems in particular have attained widespread use. These personal computer systems now provide computing power to many segments of today's modern society. A personal computer system can usually be defined as a desktop, floor-standing, or portable microcomputer that includes a system unit having a system processor with associated volatile and non-volatile memory, a display monitor, a keyboard, one or more floppy diskette drives, a hard disk storage device and an optional printer. One of the distinguishing characteristics of these systems is the use of a system board or motherboard to electrically connect these components together. These personal computer systems are information handling systems which are designed primarily to give independent computing power to a single user and are inexpensively priced for purchase by individuals or small businesses.

Portable computers are often referred to as laptop, notebook or subnotebook computers. These computers typically incorporate a flat panel display such as a liquid crystal display (LCD) or other relatively small display. Portable computers also often provide for coupling to a conventional standalone display monitor. The flat panel displays used in these small computers tend to be sensitive electronic devices. These displays can be damaged unless their components are turned on and off by control signals in a proper sequence with proper timing.

Generally there are three types of signals which are supplied to a panel display, namely LCDON, CLOCK/DATA and LCDENA. LCDON is a signal which instructs the panel display to turn on. CLOCK/DATA represents the clocking and data signals which are provided to the panel display. LCDENA is the display enable signal. To avoid physically damaging the panel display, the LCDON, CLOCK/DATA and LCDENA are timed and sequenced such that CLOCK/DATA signals are not active while LCDON is inactive. The LCDON, CLOCK/DATA and LCDENA are also timed and sequenced such that LCDENA is not active while the CLOCK/DATA signals are inactive. FIG. 1A–1C show the proper conventional sequence of LCDON, CLOCK/DATA and LCDENA to turn on a panel display. FIG. 1D–1F show the proper conventional sequence of LCDON, CLOCK/DATA and LCDENA to turn off a panel display.

In typical conventional portable computers, the sequencing and timing of the signals supplied to the flat panel display are handled by separate system board components. Unfortunately, this arrangement requires the video BIOS (basic input output system) code to explicitly tell the system components to provide the proper timing. This constraint means that a customized video BIOS has to be written for each different system board design. Alternatively, the system BIOS code would have to process special procedure calls from the video BIOS to appropriately sequence the signals supplied to the flat panel display.

Another approach is used in the Dell Latitude XP computer which employs a Western Digital WD90C24A graphics controller. In this particular graphics controller, a separate register bit is used to control each step of the power sequence for the flat panel display. FIG. 2 shows such a graphics controller 10 which includes a register PR19 of which bit 4 controls the timing of the display enable signal (LCDENA) supplied by controller 10 to display 15. Graphics controller 10 also includes a PR4 register of which bit 5 controls the timing of the clock and data signals supplied by controller 10 to display 15. Graphics controller 10 further includes a PR5 register of which bit 2 controls timing of the panel-on signal (LCDON) supplied by controller 10 to display 15. This approach of providing a separate register bit for controlling each step of the power sequence permits more precise control of the sequencing and timing of the control signals supplied to the flat panel display. Unfortunately however, since each step must be controlled separately, and each register is publicly documented and programmable by the user, it is possible that the register contents can be improperly programmed or corrupted. If the register contents become corrupted, either by ill-behaved software or other reasons, the control signal sequence and timing supplied to the flat panel display could be altered to an improper sequence and timing which may cause damage to the flat panel display.

Some graphics controllers include a single register bit which automatically starts a proper control signal sequence when a write is made to that register bit. However, in this approach, considerable flexibility is lost unless the signal sequence is programmable, in which case the contents of the single register are still subject to corruption in such a graphics controller.

SUMMARY OF THE INVENTION

A computer system is disclosed which advantageously resists corruption of the sequence and timing of the control signals for the display. The effects of ill-behaved software on the display are thus significantly reduced. The computer system includes an improved graphics controller arrangement which advantageously does not require a significant number of additional components. Another advantage of the disclosed computer system is the generation of a proper power down sequence without host processor intervention.

In accordance with one embodiment of the present invention, an information handling system is provided which includes a processor and a main memory coupled to the processor. The system also includes a graphics controller coupled to the processor. The graphics controller supplies clock signals, data signals and a display enable signal. The system further includes a display and a switching apparatus which switchably couples the display to the graphics controller. The system also includes a microcontroller which is coupled to the graphics controller, the switching apparatus and to the display. The microcontroller monitors the enable signal for a first transition. In response to detecting a first transition in the enable signal, the microcontroller generates a first sequence of display control signals to power-up the display. The microcontroller activates the switching apparatus to a coupling state to permit transmission of the clock signals and data signals from the graphics controller to the display after the microcontroller detects the first transition in the enable signal.

In one embodiment, the microcontroller further generates a second sequence of display control signals to power-down the display when the microcontroller detects a second transition in the enable signal. The microcontroller activates the switching apparatus to decouple the display from the graphics controller after the microcontroller detects the second transition in the enable signal.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 4A is a timing diagram of the LCDON signal generated by the graphics controller as part of the panel-on control signal sequence.

FIG. 4B is a timing diagram of the CLOCKS/DATA signal as generated by the graphics controller as part of the panel-on control signal sequence.

FIG. 4C is a timing diagram of the LCDENA signal as generated by the graphics controller as part of the panel-on control signal sequence.

FIG. 4D is a timing diagram of the REAL_LCDON signal provided to the panel display as part of the panel-on control signal sequence.

FIG. 4E is a timing diagram of the BUFFER OUTPUT ENABLE signal provided to the panel display as part of the panel-on control signal sequence.

FIG. 4F is a timing diagram of the CLOCKS/DATA signal provided to the panel display as part of the panel-on control signal sequence.

FIG. 4G is a timing diagram of the REAL_LCDENA signal provided to the panel display as part of the panel-on control signal sequence.

FIG. 7A-7B is a flow chart depicting the process flow implemented by the microcontroller of the computer system of FIG. 3A.

DETAILED DESCRIPTION OF THE INVENTION

Figure 1A:
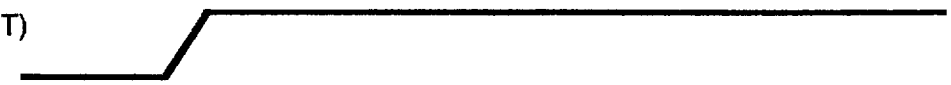
FIG. 1A is a timing diagram of the LCDON signal for a conventional panel-on signal sequence.
Figure 1B:
FIG. 1B is a timing diagram of the CLOCKS/DATA signal for a conventional panel-on signal sequence.
Figure 1C:
FIG. 1C is a timing diagram of the LCDENA signal for a conventional panel-on signal sequence.
Figure 1D:
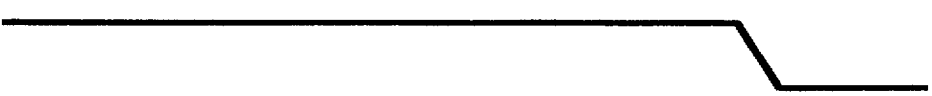
FIG. 1D is a timing diagram of the LCDON signal for a conventional panel-off signal sequence.
Figure 1E:
FIG. 1E is a timing diagram of the CLOCKS/DATA signal for a conventional panel-off signal sequence.
Figure 1F:
FIG. 1F is a timing diagram of the LCDENA signal for a conventional panel-off signal sequence.
Figure 2:
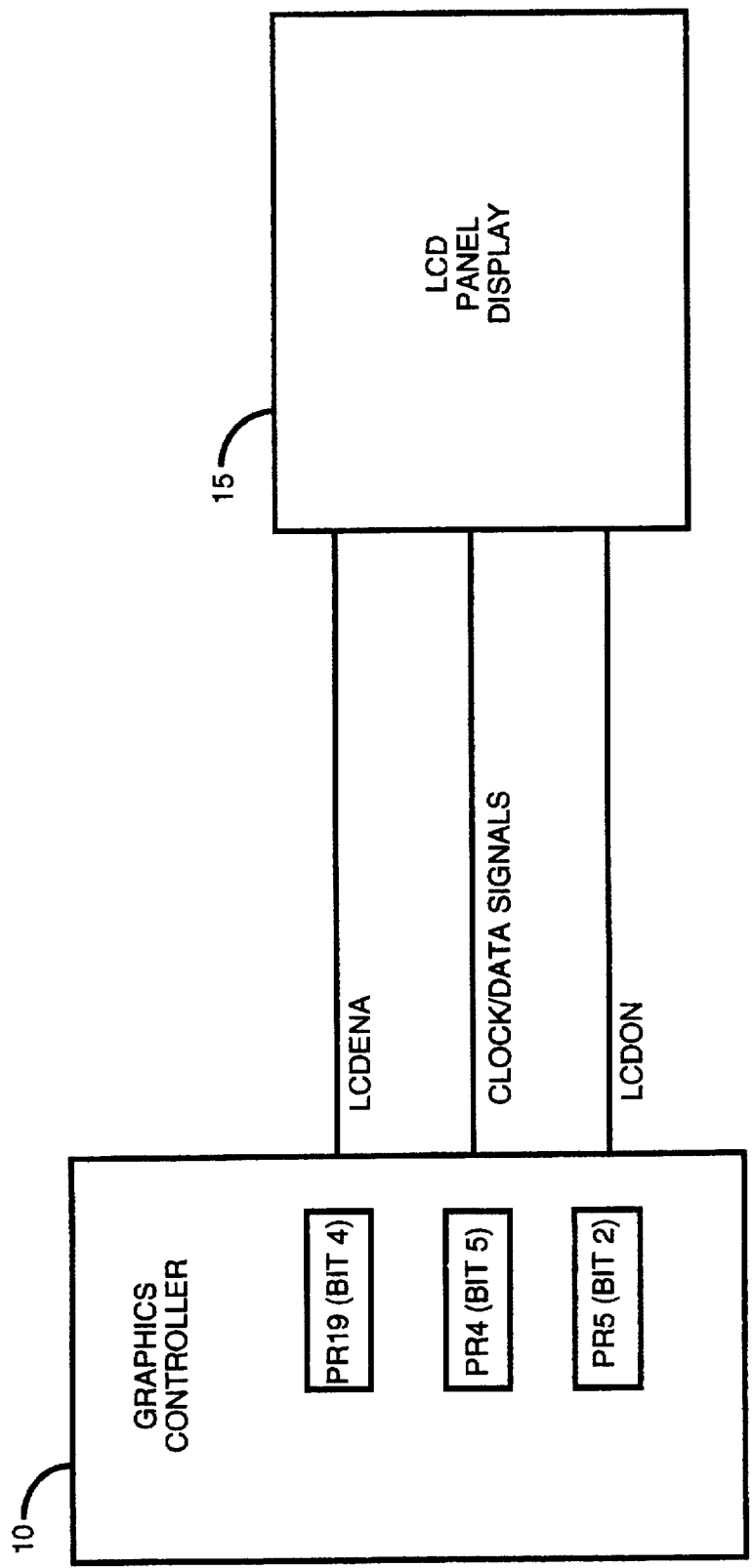
FIG. 2 is a block diagram of a conventional graphics controller coupled to a flat panel display.
Figure 3A:
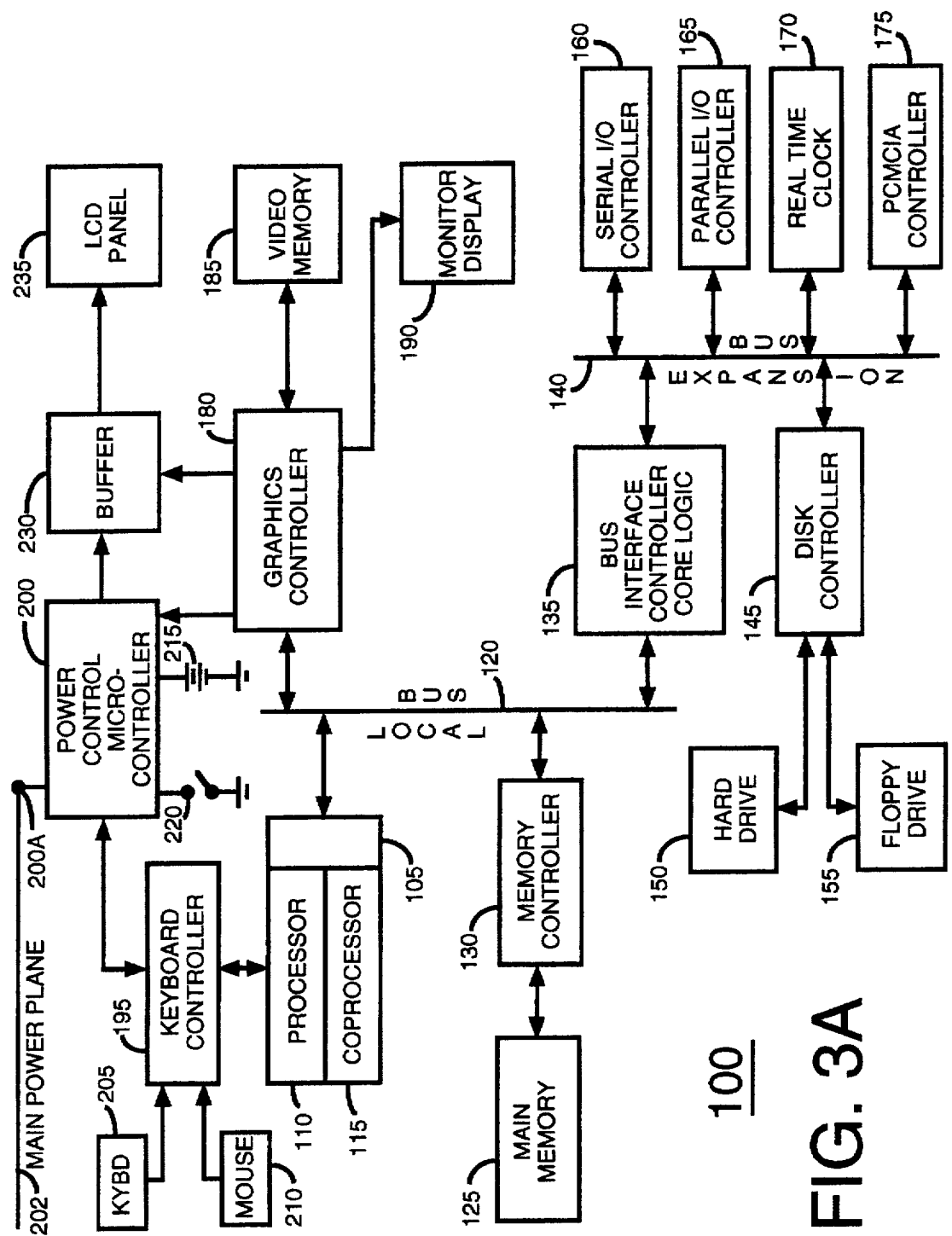
FIG. 3A is a block diagram of a computer system employing protected graphics display control signal sequencing.

FIG. 3A is a block diagram of a computer 100 which employs protected display control signal sequencing. Computer 100 includes a microprocessor 105 having a processor 110 for handling integer operations and a coprocessor 115 for handling floating point operations. Microprocessor 105 is coupled to a local bus 120. A main memory 125 of dynamic random access memory (DRAM) modules is coupled to local bus 120 by a memory controller 130.

A bus interface controller 135 couples local bus 120 to an expansion bus 140. Expansion bus 140 is an industry standard architecture (ISA) bus or other bus architecture, if desired. A disk controller 145 couples a hard drive 150 and a floppy drive 155 to expansion bus 140 as shown. Other devices such as serial I/O controller 160, parallel I/O controller 165, real time clock 170 and PCMCIA (Personal Computer Memory Card International Association) controller 175 are also coupled to expansion bus 140.

A graphics controller 180 is coupled to local bus 120. Graphics controller 180 is coupled to a video memory 185 which stores information to be displayed. Graphics controller 180 can also be optionally coupled to a standalone monitor display 190 as shown in FIG. 3A. One graphics controller that can be employed as graphics controller 180 is the Western Digital WD90C24A graphics controller.

A keyboard controller 195 is coupled between microprocessor 105 and a power control microcontroller 200. Keyboard controller 195 is a microcontroller which interfaces input devices such as keyboard 205 and pointing device 210 to microprocessor 105. Power control microcontroller 200 is a Motorola 6805 microcontroller in this particular embodiment. Microcontroller 200 is coupled to a battery 215 to control the distribution of energy from the battery to the many subsystems and components of computer 100. Power control microcontroller 200 is coupled at output 200A to the main power plane 202 which supplies power to many of the components of the computer. Moreover, microcontroller 200 monitors the charge level of battery 215 to determine when to charge and when not to charge battery 215. Microcontroller 200 is coupled to a main power switch 220 which the user actuates to turn the computer on and off.

Graphics controller 180 produces control signals which are intercepted by microcontroller 200 and buffer 230 before being applied to LCD panel display 235. Buffer 230 is coupled between graphics controller 180 and LCD panel display 235 to provide a signal path therebetween, such signal path being controlled under the direction of microcontroller 200. Buffer 230 effectively acts as a gate between graphics controller 180 and LCD panel 235 as will be discussed in more detail subsequently.

Figure 3B:
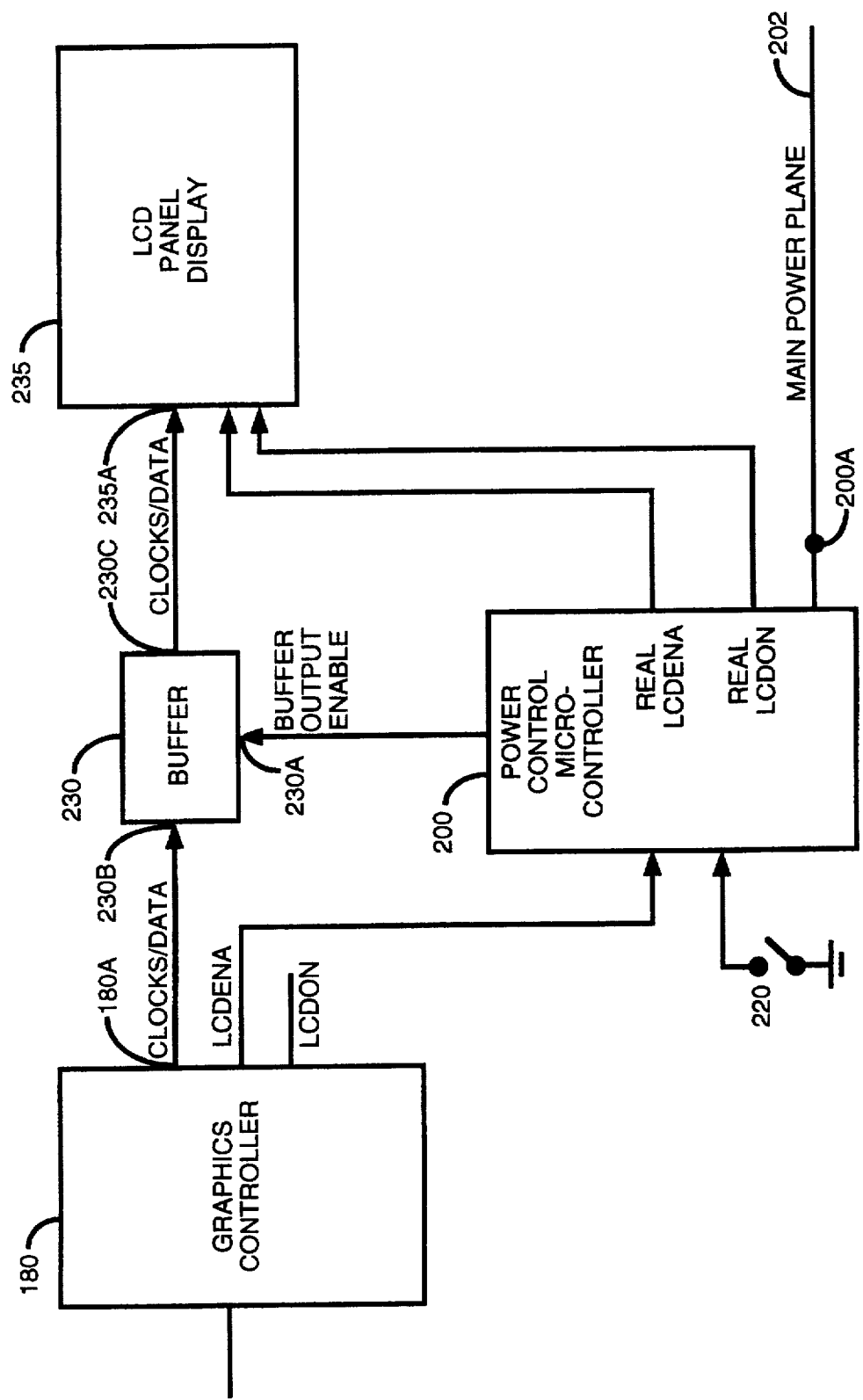
FIG. 3B is a block diagram of the graphics controller, microcontroller and panel display portion of the computer system of FIG. 3A.

FIG. 3B is a block diagram which shows more details of the interconnection of graphics controller 180, microcontroller 200, buffer 230 and panel display 235. Graphics controller 180 includes a CLOCKS/DATA output 180A which is coupled via buffer 230 to a CLOCKS/DATA input 235A of panel display 235. Buffer 230 is a tri-state buffer including an output enable input 230A which controls the passing of CLOCKS/DATA signals from buffer input 230B to buffer output 230C. In this particular embodiment, buffer 230 is a Texas Instruments Model No. ACT 16244 tri-state buffer. Depending on the state of the output enable signal provided to buffer input 230A by power microcontroller 200, the CLOCKS/DATA signals from graphics controller 180 are either permitted or not permitted to pass through buffer 230 to panel display 235. In this particular embodiment, when the output enable signal goes high, the CLOCKS/DATA signals from the graphics controller 180 are coupled through to LCD panel display 235.

Graphics controller 180 generates an LCD enable signal LCDENA signal which is intended to enable an LCD panel display for subsequent power up and reception of clock and data signals. The LCDENA signal from graphics controller 180 is coupled to microcontroller 200 so that microcontroller 200 intercepts the LCDENA signal before it can be passed to the LCD panel display 235. Microcontroller 200 generates its own REAL__LCDENA signal with low-high and high-low transitions at appropriate times as shown and discussed with reference to the timing diagrams of FIGS. 4A-4F, FIGS. 5A-5F and FIGS. 6A-6F. The REAL__ LCDENA signal is supplied to panel display 235 to enable the panel display at the appropriate time.

In actual practice, the CLOCKS signals at graphics controller output 180A includes 3 separate clock signals, namely a vertical sync clock, a horizontal sync clock and a pixel clock. Also, in actual practice, the DATA signals generated at graphics controller output 180A include a plurality of data signals. For example, if a super twist nematic (STN) type LCD flat panel display, such as the Model No. LM64C15P manufactured by Sharp Electronics Corporation is used as flat panel display 235, then graphics controller 180 generates the following sixteen (16) DATA signals specified by the flat panel display manufacturer: DL0-DL7 and DU0-DU7. However, if a thin film transistor (TFT) type LCD flat panel display, such as the Model No. LQ94D012 manufactured by Sharp Electronics Corporation is used as flat panel display 235, then graphics controller 180 generates the following nine (9) DATA signals specified by the flat panel display manufacturer: G0, G1, G2, B0, B1, B2, R0, R1 and R2.

Graphics controller 180 includes a panel-on output (LCDON) which is unconnected. Power microcontroller 200 generates a REAL__LCDON signal at the appropriate time in the later discussed panel-on and panel-off signal sequences to instruct panel display 235 when to turn on or off.

The panel-on signal sequence which is timed and controlled under the direction of microcontroller 200 is now discussed with reference to the timing diagrams of FIGS. 4A-4F and FIGS. 5A-5F. FIGS. 4A-4F show the relative timing and sequence of the control signals which are provided to panel display 235 to turn on the display. This is the "panel-on" sequence which is initiated by graphics controller 180. FIGS. 5A-5F show the relative timing and sequence of the control signals which are provided to panel display 235 to turn off the display. This is the "panel-off" sequence which is initiated by graphics controller 180. It will been seen later that, in response to certain inputs, the power microcontroller 200 itself can initiate a panel-on and panel-off signal sequence to the panel display.

It is noted that cross hatching is used in the drawings to indicate those signals such as the CLOCKS/DATA signal of FIG. 4B which contain multiple signals which may vary in value over time.

Returning to FIG. 4A, the LCDON signal from graphics controller 180 is depicted. However, in this particular embodiment, the LCDON signal from the graphics controller is not used to control the turning on and off of panel display 235. The LCDON output of graphics controller 180 is depicted as being unconnected in the circuitry of FIG. 3B.

FIG. 4C shows the LCDENA signal (LCD panel enable signal) which is generated by graphics controller 180 to enable the display. LCDENA is an active high signal such that, from the graphics controller's perspective, LCDENA goes high when the graphics controller desires to enable the display and LCDENA goes low when the graphics controller desires to disable the display. Unlike in past computers, the LCDENA signal in computer 100 is not directly coupled to LCD panel 235. Rather, the LCDENA signal is intercepted by microcontroller 200 which monitors for the transition in the LCDENA signal. When microcontroller 200 detects a low-high transition 240 in the LCDENA signal, it subsequently generates a REAL__LCDON signal as indicated in FIG. 4D. This REAL__LCDON signal is provided to panel display 235 to commence the power-up of display 235. It is noted that prior to the time that graphics controller 180 generates the low-high transition 240 in the LCDENA signal, the graphics controller makes the CLOCKS/DATA signal available at output 180A as indicated in FIG. 4B.

The reception by microcontroller 200 of a low to high transition 240 in the LCDENA signal is a triggering event which starts the sequence of control signals indicated in FIG. 4D-4G. When LCDENA signal transition 240 occurs as shown in FIG. 4C, the REAL__LCDON signal generated by microcontroller 200 transitions high at 245 to instruct panel display 235 to commence power-up. At this time the BUFFER OUTPUT ENABLE signal is still low as indicated in FIG. 4E such that the CLOCKS/DATA signals from graphics controller 180 are prevented from reaching panel display 235. However, subsequent to the REAL_LCDON signal low to high transition 245, microcontroller 200 causes the BUFFER OUTPUT ENABLE signal of FIG. 4E to transition from low to high at transition 250. Tri-state buffer 230 then switches to a conductive mode or coupling mode such that the CLOCKS/DATA signals from graphics controller 180 are now supplied by buffer 230 to panel display 235 as indicated in FIG. 4F at 255. Microcontroller 200 then causes the REAL_LCDENA signal supplied to panel display 235 to go high at transition 260 to enable panel display 235. When so enabled, panel display 235 displays the DATA signals received from graphics controller 235 until such time that is disabled as later described with reference to the panel-off sequence.

Figure 5A:
FIG. 5A is a timing diagram of the LCDON signal generated by the graphics controller as part of the panel-off control signal sequence which is initiated by the graphics controller.
Figure 5B:
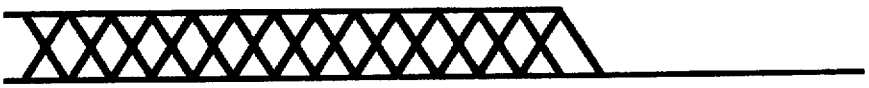
FIG. 5B is a timing diagram of the CLOCKS/DATA signal as generated by the graphics controller as part of the panel-off control signal sequence which is initiated by the graphics controller.
Figure 5C:
FIG. 5C is a timing diagram of the LCDENA signal as generated by the graphics controller as part of the panel-off control signal sequence which is initiated by the graphics controller.
Figure 5D:
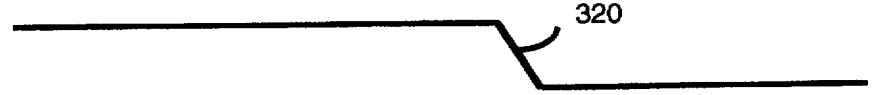
FIG. 5D is a timing diagram of the REAL_LCDON signal provided to the panel display as part of the panel-off control signal sequence which is initiated by the graphics controller.
Figure 5E:
FIG. 5E is a timing diagram of the BUFFER OUTPUT ENABLE signal provided to the panel display as part of the panel-off control signal sequence which is initiated by the graphics controller.
Figure 5F:
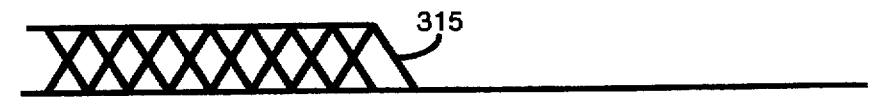
FIG. 5F is a timing diagram of the CLOCKS/DATA signal provided to the panel display as part of the panel-off control signal sequence which is initiated by the graphics controller.
Figure 5G:
FIG. 5G is a timing diagram of the REAL_LCDENA signal provided to the panel display as part of the panel-off control signal sequence which is initiated by the graphics controller.
Figure 6A:
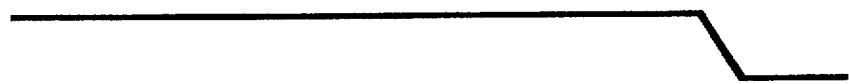
FIG. 6A is a timing diagram of the LCDON signal generated by the graphics controller as part of the panel-off control signal sequence which is initiated by the power microcontroller.
Figure 6B:
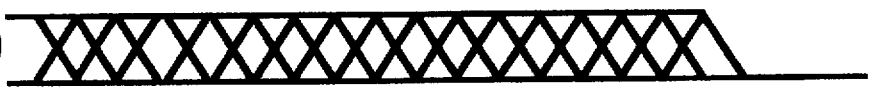
FIG. 6B is a timing diagram of the CLOCKS/DATA signal as generated by the graphics controller as part of the panel-off control signal sequence which is initiated by the power microcontroller.
Figure 6C:
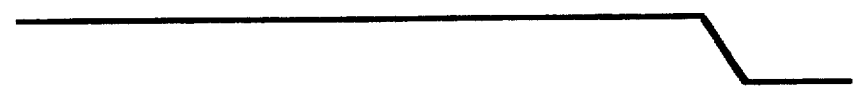
FIG. 6C is a timing diagram of the LCDENA signal as generated by the graphics controller as part of the panel-off control signal sequence which is initiated by the power microcontroller.
Figure 6D:
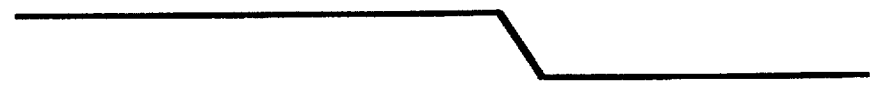
FIG. 6D is a timing diagram of the REAL_LCDON signal provided to the panel display as part of the panel-off control signal sequence which is initiated by the power microcontroller.
Figure 6E:
FIG. 6E is a timing diagram of the BUFFER OUTPUT ENABLE signal provided to the panel display as part of the panel-off control signal sequence which is initiated by the power microcontroller.
Figure 6F:
FIG. 6F is a timing diagram of the CLOCKS/DATA signal provided to the panel display as part of the panel-off control signal sequence which is initiated by the power microcontroller.
Figure 6G:
FIG. 6G is a timing diagram of the REAL_LCDENA signal provided to the panel display as part of the panel-off control signal sequence which is initiated by the power microcontroller.

The panel-off sequence is shown in FIGS. 5A–5G. While DATA signals are being supplied to panel display 235, microcontroller 200 monitors the LCDENA signal from graphics controller 180 for a high to low transition 300 as seen in FIG. 5C. When LCDENA signal transition 300 is detected, microcontroller 200 subsequently generates a high to low transition 305 in the REAL_LCDENA signal as shown in FIG. 5G. The REAL_LCDENA signal is supplied to panel display 235 to instruct panel display 235 to disable. This disable step is necessary before completely powering down the panel display.

Subsequent to transition 305 in the REAL_LCDENA signal, microcontroller 200 causes the BUFFER OUTPUT ENABLE signal to go low at transition 310 as shown in FIG. 5E. This event causes buffer 230 to decouple panel display 235 from graphics controller 180 as indicated by the cessation of the CLOCKS/DATA signals received by panel display 235 and shown at 315 in FIG. 5F. Microcontroller 200 then causes the REAL_LCDON signal supplied to panel display 235 to transition from low to high at 320 as shown in FIG. 5D. This causes completion of the powering down of panel display 235 and finishes the panel-off sequence.

The generation of the control signal sequences for powering up panel display 235 and for powering down the display is thus substantially isolated from graphics controller 180 by microcontroller 200. Microcontroller 200 is programmed with appropriate control software to initiate the panel-on sequence of FIGS. 4A–4G and the panel-off sequence of FIGS. 5A–5G at the appropriates times determined by transitions in the LCDENA signal from graphics controller 180. It is noted that microcontroller 200 generates its own REAL_LCDENA signal which is supplied to panel display 235 in place of the LCDENA signal from graphics controller 180.

While the above described panel-on and panel-off control signal sequences were initiated by transitions in the LCDENA signal from the graphics controller, it is noted that a panel-off sequence can also be initiated by power controller 200 itself in response to certain other inputs. For example the panel-off sequence of FIG. 6A–6G is initiated in response to the toggling of power switch 220 (see FIG. 3B) to the off position. In response to such toggling, panel display 235 is safely sequenced off and power is removed from the power planes to shut the computer system down. In contrast, when power switch 220 is toggled to the on position to turn on the computer system, the graphics controller initiated power-on sequence of FIGS. 4A–4G is used to power-on the panel display.

Figure 7B:
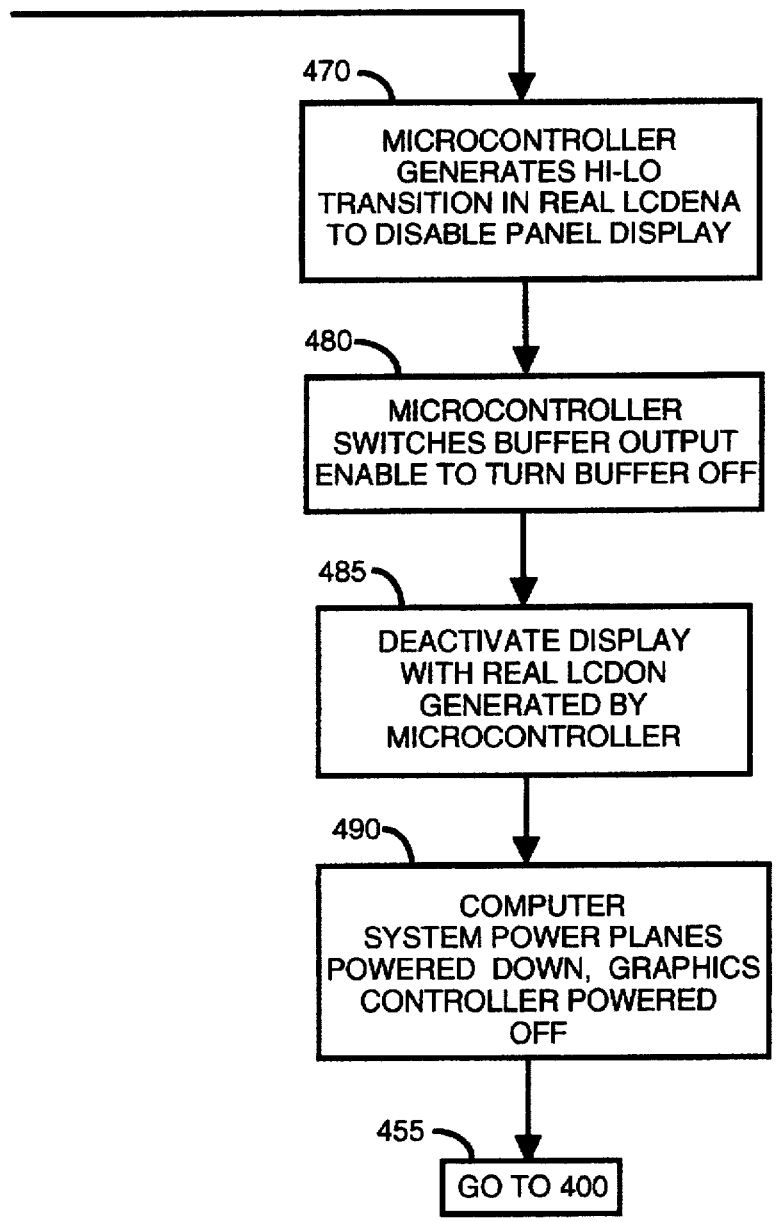

Microcontroller 200 is programmed with control software which implements the process flow shown in the flow chart of FIG. 7A–7B. This process flow is initiated with START block 400 after which graphics controller 180 starts generating its LCDENA panel display signal as per block 405. Microcontroller 200 monitors for a low-high transition in the LCDENA signal at decision block 410. If a low-high transition in the LCDENA signal is detected, then as per block 415, microcontroller 200 starts to activate panel display 235 by generating a low-high transition in the REAL_LCDON signal that microcontroller 200 provides to panel display 235. This initiates the panel-on signal sequence.

Microcontroller 200 then changes the state of the BUFFER OUTPUT ENABLE signal in block 420 to cause tri-state buffer 230 to enter a conductive state (coupling state) by which CLOCKS/DATA signals (graphics signals) generated by graphics controller 180 are passed through buffer 230 to display 235 as indicated in block 425. Microcontroller 200 then generates a low-high transition in the REAL_LCDENA signal that it provides to panel display 235 to enable the display as per block 430. Panel display 235 continues to display graphics signals that it receives from graphics controller 180 until the LCDENA signal generated by graphics controller transitions from high to low which indicates that graphics controller 180 is acting to turn off the panel display 235. Alternatively, panel display 235 is turned off by power microcontroller 200 as part of the computer system power down sequence which shuts off the computer system when the user toggles power switch 220.

More specifically, microcontroller 200 monitors power switch 220 to determine when switch 220 is toggled off as per decision block 432. If power switch 220 is found not to be toggled off, then process flow continues to decision block 435. At decision block 435, microcontroller 200 continually monitors for the previously mentioned high to low transition in the LCDENA signal. It will be recalled that such a high to low transition in the LCDENA signal indicates that the graphics controller is signalling that shut down of the panel display is desired.

When such a high to low transition is detected in the LCDENA signal, microcontroller 200 generates a high to low transition in the REAL_LCDENA signal to initiate the panel-off signal sequence as indicated in block 440. Microcontroller 200 then in block 445 changes the state of the BUFFER OUTPUT ENABLE signal to cause tri-state buffer 230 to enter a non-conductive state (de-coupling state) by which CLOCKS/DATA signals (graphics signals) generated by graphics controller 180 do not pass through buffer 230 to display 235. Deactivation of panel display 235 is completed when microcontroller 200 generates a high to low transition in the REAL_LCDON signal thus disabling the display as indicated in block 450. At block 455 process flow continues back to start block 400 and ultimately back to decision block 410 at which microcontroller 200 again monitors for a low to high transition in the LCDENA signal from graphics controller 180.

If at decision block 435 microcontroller 200 does not find a transition from high to low in the LCDENA signal from the graphics controller, then process flow continues back to decision block 432 at which power switch 220 is again checked to see if it has been toggled off. If microcontroller 200 senses that power switch 220 has been toggled off to shut down the computer system, then process flow continues to block 470 of FIG. 7B to commence a safe shutdown of the panel display and computer system. More specifically, microcontroller 200 generates a high to low transition in the REAL_LCDENA signal to disable panel display 235 as per block 470. Microcontroller 200 then switches the state of the BUFFER OUTPUT ENABLE signal to return buffer 230 to the decoupling state as per block 480. The CLOCKS/DATA signal is thus decoupled from the panel display. Microcontroller 200 then causes the REAL_LCDON signal to transition from high to low to continue the process of deactivating the panel display as per block 485. Graphics controller 180 then switches the LCDON signal and LCDENA signal at the graphics controller from high to low as per block 490. In response, the CLOCKS/DATA signal from the graphics controller is turned off and the computer system's power planes are powered down.

In actual practice, short time delays are implemented between blocks 415 and 420, between blocks 425 and 430, between blocks 440 and 445, between blocks 445 and 450, between blocks 470 and 480, and between blocks 480 and 485. The time delays employed for a type of panel display from one manufacturer typically vary from the time delays that would be employed for a panel display from another manufacturer. Panel display manufacturers typically specify a range of time values between which signals such as LCDON and LCDENA are permitted to transition.

It is also noted that, while not specifically shown in the flow chart of FIGS. 7A-7B, during steps 415-420 microcontroller 200 also monitors the LCDENA signal to determine if the LCDENA signal transitions from high to low. If such a high to low transition in the LCDENA signal is detected, then steps 415 and 430 are aborted and instead the power off sequence specified by steps 440 to 450 is carried out.

The above information handling system circuitry has been described in terms of positive logic which employs active high and inactive low signals to facilitate understanding of the concepts involved. Those skilled in the art will appreciate that in actual practice it can be desirable to employ inverted logic to implement the teachings herein.

While an information handling apparatus with protected display control signal sequencing is disclosed above, a method of controlling a display system is also disclosed. The controlled display system which is employed to practice the method includes a graphics controller coupled by a switching apparatus to a display. The controlled display system further includes a microcontroller coupled to the graphics controller, the switching apparatus and the display. Briefly, the method is summarized as including the step of the graphics controller generating clock signals, data signals and a first enable signal. The method also includes the step of monitoring, by the microcontroller, for a transition in the first enable signal. The method further includes the step of generating, by the microcontroller, a first sequence of display control signals to power-up the display when the microcontroller detects the first transition of the enable signal. The method also includes the step of activating, by the microcontroller, the switching apparatus to a coupling state to permit transmission of the clock signals and data signals from the graphics controller to the display after the microcontroller detects the first transition of the enable signal.

The foregoing has described an information handling system or computer system which resists corruption of the sequence and timing of the control signals provided to a flat panel display or other display which might be damaged by improperly sequenced display control signals. The effects of ill-behaved software on the display are thus significantly reduced. Dual use is advantageously made of the power control microcontroller in that addition to its other power control activities, the power control microcontroller also controls the sequencing and timing of graphics control signals supplied to the display. The above described advantages are thus attained without a dramatic increase in parts count in the computer system.

While only certain preferred features of the invention have been shown byway of illustration, many modifications and changes will occur. It is, therefore, to be understood that the present claims are intended to cover all such modifications and changes which fall within the true spirit of the invention.

We claim:
1. An information handling system comprising:
   a processor;
   a main memory coupled to the processor;
   a graphics controller coupled to the processor, the graphics controller supplying clock signals, data signals and an enable signal;
   a display;
   a switching apparatus switchably coupling the display to the graphics controller; and
   a microcontroller coupled to the graphics controller, the switching apparatus and to the display, the microcontroller monitoring for a first transition in the enable signal, the microcontroller generating a first sequence of display control signals to power-up the display when the microcontroller detects the first transition in the enable signal, the microcontroller activating the switching apparatus to a coupling state to permit transmission of the clock signals and data signals from the graphics controller to the display after the microcontroller detects the first transition in the enable signal.

2. The information handling system of claim 1 wherein the microcontroller further generates a second sequence of display control signals to power-down the display when the microcontroller detects a second transition in the enable signal, the microcontroller activating the switching apparatus to decouple the display from the graphics controller after the microcontroller detects the second transition in the enable signal.

3. The information handling system of claim 1 wherein the display is a flat panel display.

4. The information handling system of claim 1 wherein the switching apparatus is a tri-state buffer.

5. The information handling system of claim 1 further comprising:
   a main power plane for supplying power within the information handling system;
   a power switch coupled to the microcontroller;
   said microcontroller further monitoring for switching of the power switch to an off state which signifies that the information handling system is to be powered down, and in response the microcontroller generating a second sequence of display control signals to power down the display and activate the switching apparatus to decouple the display from the graphics controller, said microcontroller subsequently powering down the main power plane.

6. A graphics control system for an information handling apparatus which includes a processor and a main memory coupled to the processor, the information handling apparatus further including a display, the graphics control system comprising:
   a graphics controller for supplying clock signals, data signals and an enable signal;

a switching apparatus switchably coupling the graphics controller to the display; and a microcontroller coupled to the graphics controller, the switching apparatus and to the display, the microcontroller monitoring for a first transition in the enable signal, the microcontroller generating a first sequence of display control signals to power-up the display when the microcontroller detects the first transition in the enable signal, the microcontroller activating the switching apparatus to a coupling state to permit transmission of the clock signals and data signals from the graphics controller to the display after the microcontroller detects the first transition in the enable signal.

7. The information handling system of claim 6 wherein the microcontroller further generates a second sequence of display control signals to power-down the display when the microcontroller detects a second transition in the enable signal, the microcontroller activating the switching apparatus to decouple the display from the graphics controller after the microcontroller detects the second transition in the enable signal.

8. The information handling system of claim 6 wherein the display is a flat panel display.

9. The information handling system of claim 6 wherein the switching apparatus is a tri-state buffer.

10. An information handling system comprising:

a processor;

a local bus coupled to the processor;

a main memory coupled to the processor;

a graphics controller coupled to the local bus, the graphics controller supplying clock signals, data signals and an enable signal;

a display;

a switching apparatus switchably coupling the display to the graphics controller; and control means, coupled to the graphics controller, the switching apparatus and to the display, the control means monitoring for a first transition in the enable signal, the control means generating a first sequence of display control signals to power-up the display when the control means detects the first transition in the enable signal, the control means activating the switching apparatus to a coupling state to permit transmission of the clock signals and data signals from the graphics controller to the display after the control means detects the first transition in the enable signal.

11. The information handling system of claim 10 wherein the control means further generates a second sequence of display control signals to power-down the display when the control means detects a second transition in the enable signal, the control means activating the switching apparatus to decouple the display from the graphics controller after the control means detects the second transition in the enable signal.

12. The information handling system of claim 10 wherein the display is a flat panel display.

13. The information handling system of claim 10 wherein the switching apparatus is a tri-state buffer.

14. A method of controlling a display system for an information handling apparatus, the display system including a graphics controller coupled by a switching apparatus to a display, the display system further including a microcontroller coupled to the graphics controller, the switching apparatus and the display, the method comprising the steps of:

the graphics controller generating clock signals, data signals and an enable signal;

monitoring, by the microcontroller, for a first transition in the enable signal;

generating, by the microcontroller, a first sequence of display control signals to power-up the display when the microcontroller detects the first transition of the enable signal; and activating, by the microcontroller, the switching apparatus to a coupling state to permit transmission of the clock signals and data signals from the graphics controller to the display after the microcontroller detects the first transition of the enable signal.

15. The method of claim 14 further comprising the step of generating, by the microcontroller, a second sequence of display control signals to power-down the display when the microcontroller detects a second transition in the enable signal; and activating, by the microcontroller, the switching apparatus to decouple the display from the graphics controller after the microcontroller detects the second transition in the enable signal.

16. The method of claim 14 wherein the information handling apparatus includes a main power plane coupled to the microcontroller and a power switch coupled to the microcontroller, the method further comprising:

monitoring the power switch by the microcontroller to determine when the power switch is switched to an off state which indicates that the information handling apparatus is to be powered down;

generating a second sequence of display control signals by the microcontroller to power-down the display and activate the switching apparatus to decouple the display from the graphics controller, said microcontroller subsequently powering down the main power plane.

* * * * *